United States Patent [19]

Hill

[11] 4,223,923
[45] Sep. 23, 1980

[54] HYDRAULIC EXPANSION JOINT

[75] Inventor: James C. Hill, Hillside, Ill.

[73] Assignee: Lach Fluid Power, Inc., Maywood, Ill.

[21] Appl. No.: 966,817

[22] Filed: Dec. 6, 1978

[51] Int. Cl.² ............................................. F16L 27/12
[52] U.S. Cl. ........................................ 285/95; 277/24; 285/302; 285/370; 285/DIG. 1
[58] Field of Search ................... 285/95, DIG. 1, 32, 285/31, 302, 370; 277/24

[56] References Cited

U.S. PATENT DOCUMENTS

| | | | |
|---|---|---|---|
| 938,984 | 11/1909 | Curry | 285/302 X |
| 1,079,350 | 11/1913 | Kelly | 285/302 |
| 2,136,770 | 11/1938 | Witzenmann | 285/370 X |
| 2,445,580 | 7/1948 | Kasten | 285/31 |
| 2,480,174 | 8/1949 | Yost | 285/388 X |
| 2,979,350 | 4/1961 | Lansky | 277/24 |
| 3,752,507 | 8/1973 | Maurer et al. | 285/32 X |

Primary Examiner—Thomas F. Callaghan
Attorney, Agent, or Firm—Lloyd L. Zickert

[57] ABSTRACT

An expansion joint for interconnecting pipes or hoses which includes a floating sleeve and a pair of pipe or hose fittings slidably mounted on the sleeve. The fittings are provided with seals to coact with the sleeve and wipers to coact with the sleeve together with stop means for restricting the relative movement between the fittings and the sleeve.

3 Claims, 4 Drawing Figures

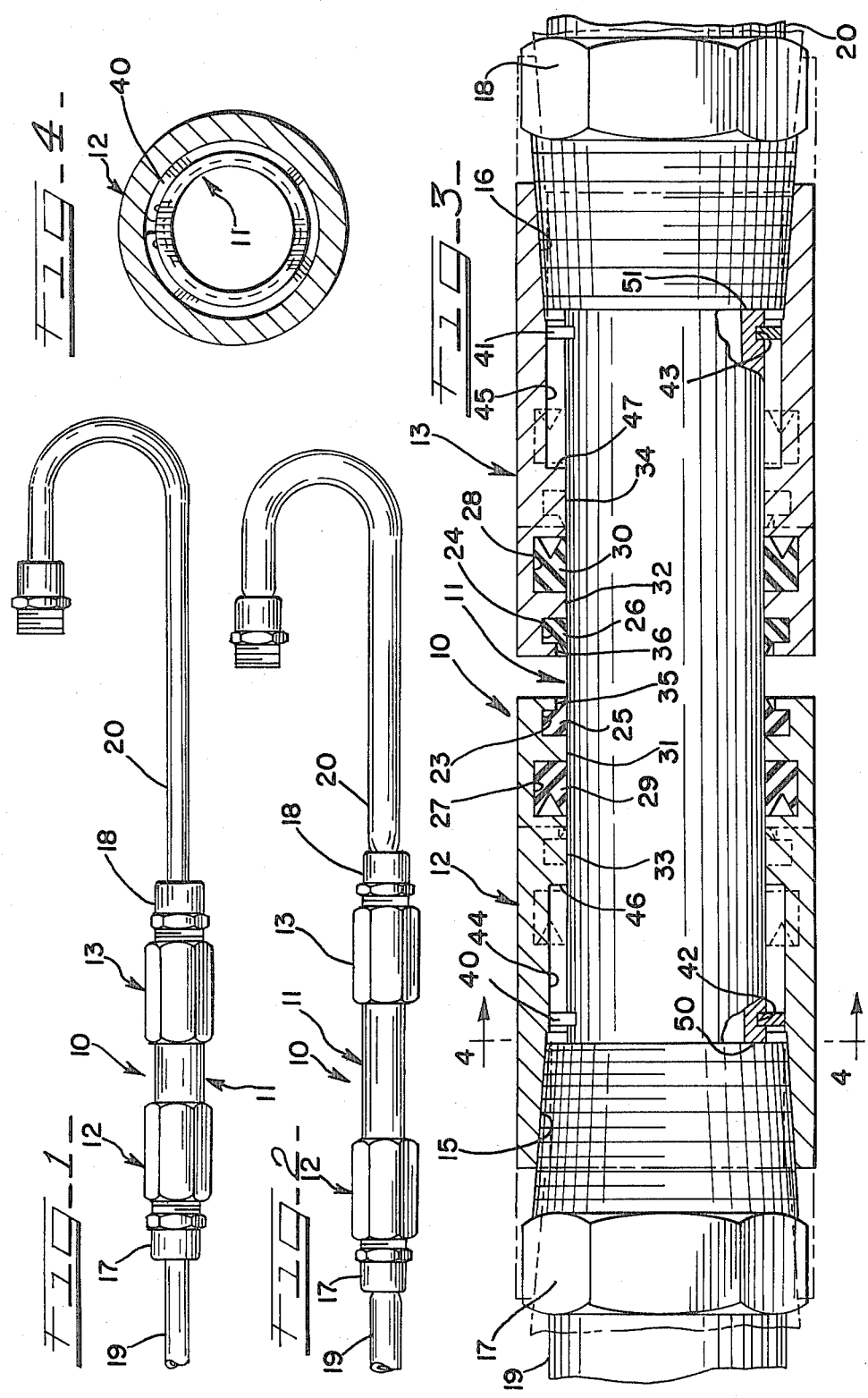

HYDRAULIC EXPANSION JOINT

This invention relates in general to an expansion joint for interconnecting pipes or hoses, and more particularly to an expansion joint for hydraulic systems where the pressure differential in the interconnecting hoses or pipes causes a strain on those hoses or pipes unless their length is allowed to easily fluctuate, and still more particularly to a hydraulic expansion joint having a hydraulically balanced floating sleeve slidably mounted between pipe and hose fittings.

Heretofore, it has been known to provide various systems for use in hydraulic hose and pipelines to compensate for the changing length of hose, but the systems have not permitted movement except to the detriment of the hose and/or any connections thereto. Hydraulic hose of a sufficient size is usually made of rubber and spiral wrap and when subjected to pressure the rubber and spiral wraps expand, thereby resulting in a shortening of the hose. When the pressure is relieved, the hose grows or extends in length. If the hose is guided or in looped form, when pressure is applied, the hose will grip the guide and create wear spots on the hose and also tend to place excessive force on the connecting ends. No satisfactory system for handling the hose has been heretofore found. It is further appreciated that expansion joints have been known, but none have been known to solve the problem of changing hydraulic hose length.

The hydraulic expansion joint of the present invention is unique in that it is hydraulically balanced and will only expand when the pipe or hose moves. Further, by being hydraulically balanced, less strain and stress is placed on both fittings of the pipe or hose which are connected to the expansion joint, thereby reducing the possibility of failure at the fittings. Further, since the pipe or hose does not need to utilize any looped or guided arrangement, longer life of the hose can be obtained.

It is therefore an object of the present invention to provide a new and improved hydraulic expansion joint for interconnecting pipes or hoses and which will enhance the life of the pipes or hoses and the fittings therefor as they are subjected to high and low pressure conditions.

Another object of this invention is in the provision of a new and improved expansion joint for interconnecting hydraulic pipes or hoses which includes a hydraulically balanced floating sleeve associated with pipe or hose fittings that will enhance the life of pipe or hose connected thereto and the fittings of the pipe or hose.

Other objects, features and advantages of the invention will be apparent from the following detailed disclosure, taken in conjunction with the accompanying sheet of drawings, wherein like reference numerals refer to like parts, in which:

FIG. 1 is a plan view of the hydraulic expansion joint of the present invention interconnected with hydraulic pipe or hose and illustrating one position of the fittings of the joint relative to each other and the sleeve of the joint;

FIG. 2 is a view like FIG. 1 but illustrating another position between the fittings of the joint and the sleeve of the joint;

FIG. 3 is an axial view taken through the expansion joint of the invention showing some parts in section and other parts in full view for purposes of illustrating the invention; and FIG. 4 is a cross-sectional view taken through the expansion joint of the invention and substantially along line 4—4 of FIG. 3.

The hydraulic expansion joint of the invention overcomes wear and failure problems heretofore experienced in hydraulic line systems where hydraulic pipe or hose made of materials that can expand and contract are utilized. For example, hydraulic hose made of rubber or like materials with spiral wraps that will expand on being pressurized and contract on being depressurized are subjected to wear and failure situations not found in hydraulic lines constructed of steel or like materials. Metal fittings are provided for the hydraulic pipes or hoses concerned with the present system for connection to the hydraulic expansion joint of the present invention. Continued pressurization and depressurization of the pipe or hose causes wear spots on the pipe or hose and failure problems at the interconnection of the hose and metal fittings due to the stress and tension applied to the metal fittings. While it is contemplated that both ends of the hydraulic expansion joint of the present invention be connected to a hydraulic pipe or hose that is expandable and which when expands causes shortening of its length, it should be appreciated that the expansion joint of the present invention could be employed where it is connected only on one end and with a hydraulic hose or pipe of the expandable type and where the other end might be connected to a nonexpandable steel or the like hydraulic line.

The hydraulic expansion joint of the present invention is illustrated in the drawings generally by the numeral 10 and includes a floating sleeve 11 slidably receiving a pair of fittings 12 and 13. The fittings are identical to each other but are arranged on the sleeve in oppositely facing relationship.

The fittings 12 and 13 are structured to be suitably joined with a fitting on the end of a hydraulic pipe or hose. Each fitting 12 and 13 is externally formed to facilitate the application of a wrench or other tool when interconnecting same with a fitting of the expansion joint and as illustrated is provided internally at the end to be connected to a pipe or hose fitting with a threaded area 15 and 16, respectively. Accordingly, each expansion joint fitting will receive a pipe or hose fitting such as the pipe or hose fittings 17 and 18. In the illustrated embodiment the joint fittings are female, while the pipe or hose fittings are male. Hydraulic pipe or hose 19 and 20 are suitably secured to the pipe or hose fittings 17 and 18 respectively. The connections between the pipe or hose fittings and the pipe or hose are protected by the expansion joint of the present invention inasmuch as the stress at these connections is relieved during the expanding and contracting movements of the expansion joint as the hydraulic pipe or hose length decreases and increases during the different pressure conditions encountered.

Each expansion joint fitting 12 and 13 is identically constructed and along its interior includes respectively annular wiper slots 23 and 24 receiving ring-shaped wipers 25 and 26 and annular seal slots 27 and 28 receiving ring-shaped hydraulic seals 29 and 30. Internal lands 31 and 32 are defined between the wiper and seal slots and internal lands 33 and 34 are defined outside of the seal slots, all of which are diametrically dimensioned to be slightly greater than the external diameter of the floating sleeve 11 so that no interference would be created between the fittings and the sleeve that would inhibit relative movement therebetween. Internal lands 35 and 36 are provided on the outside of the wipers 25 and 26 of such a diameter as to accommodate the cross-sectional shape of the wipers.

The expansion joint, sleeve and fittings are preferably structured of a suitable steel, while the wipers and the seals are preferably made of a suitable material such as a polyurethane. Commercially available wipers and seals are utilized, and these wipers and seals function in a manner well known by those skilled in the art of hydraulic fittings.

In order to prevent the expansion joint fittings 12 and 13 from being separated from the floating sleeve 11, stop means is provided which includes a standard type of split retaining ring 40 and 41 engaging in an annular slot 42 and 43 formed on the external face of the sleeve 11 near each end thereof, as seen in FIGS. 3 and 4. The retaining rings are sized so that they freely move in a counter bore 44 and 45 of the fittings during the sliding movement effected between the sleeve and the fittings. Shoulders 46 and 47 at the outer lands 33 and 34 coact with the retaining rings to form the stop means for preventing the expansion joint fittings from being completely displaced from the sleeve and also defining the maximum expansion travel of the fittings relative to the sleeve. Maximum contraction travel is limited by engagement of the rings 40 and 41 with the ends of the pipe or hose fittings 17 or 18, as can be appreciated in FIG. 3.

The floating sleeve 11 has a uniform exterior diameter and a uniform internal diameter along its entire length together with opposite end faces 50 and 51 which are equal in area. Because of this equal area, the sleeve is hydraulically balanced between the fittings at all times whereby the fittings are uninhibited in their sliding movement on the floating sleeve during pressure changes. Thus, the hydraulic fluid carried in the pipes or hoses and the expansion joint will not cause any pressure differential across the sleeve and therefore not influence the operation of the expansion joint.

In operation, the expansion joint will have the fittings 12 and 13 arranged close together, such as illustrated in FIG. 1 and in FIG. 3 in solid lines, during low pressure conditions. When the joint is subjected to high pressure conditions which will cause expansion of the hose and urge shortening of the hose, the fittings will slide along the floating sleeve to compensate for the shortening force to relieve the strain on the hose and its connecting fittings, such as illustrated in FIG. 2 and in FIG. 3 in phantom.

It will be understood that modifications and variations may be effected without departing from the scope of the novel concepts of the present invention, but it is understood that this application is to be limited only by the scope of the appended claims.

The invention is hereby claimed as follows:

I claim:

1. A metal hydraulic expansion joint for interconnecting hydraulic pipes or hoses comprising, a floating sleeve having opposed ends and a pair of pipe or hose fittings slidably mounted on said sleeve and having means for securing the fittings to the pipes or hoses, said sleeve being cylindrical with substantially constant interior and exterior surfaces along its entire length and said ends having equal areas thereby hydraulically balancing the sleeve, annular wiper and annular seal means, each said fitting having spaced slots for receiving said wiper and seal means, the wiper and slot therefor being at one end of the fitting and the seal and slot therefor being spaced inwardly therefrom, lands formed on both sides of said seal slot which are sized slightly larger than the exterior surface of said sleeve, and coacting stop means on said sleeve and fittings limiting the relative movement therebetween.

2. The hydraulic expansion joint of claim 1, wherein said coacting stop means of each fitting includes a shoulder formed at the end of the land most remote from the wiper slot and a ring fitted on the exterior of said sleeve.

3. The hydraulic expansion joint of claim 2, wherein said ring is split and received in a slot formed on the exterior surface of the sleeve.

* * * * *